(12) United States Patent
Shahana

(10) Patent No.: US 10,892,628 B2
(45) Date of Patent: Jan. 12, 2021

(54) BICYCLE CONTROLLER AND BICYCLE CONTROL SYSTEM

(71) Applicant: Shimano Inc., Osaka (JP)

(72) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 380 days.

(21) Appl. No.: 15/838,516

(22) Filed: Dec. 12, 2017

(65) Prior Publication Data

US 2018/0183255 A1    Jun. 28, 2018

(30) Foreign Application Priority Data

Dec. 26, 2016   (JP) ................................ 2016-252052

(51) Int. Cl.
| | |
|---|---|
| *H02J 7/00* | (2006.01) |
| *F21S 9/02* | (2006.01) |
| *B62M 6/90* | (2010.01) |
| *B62J 99/00* | (2020.01) |
| *B62J 6/04* | (2020.01) |
| *B62J 6/02* | (2020.01) |

(Continued)

(52) U.S. Cl.
CPC ............ *H02J 7/0063* (2013.01); *B62J 99/00* (2013.01); *B62M 6/90* (2013.01); *F21S 9/02* (2013.01); *H02J 1/14* (2013.01); *B62J 3/00* (2013.01); *B62J 6/015* (2020.02); *B62J 6/02* (2013.01); *B62J 6/04* (2013.01); *B62J 33/00* (2013.01); *B62J 45/00* (2020.02); *B62J 45/40* (2020.02); *B62J 50/20* (2020.02); *B62M 6/40* (2013.01); *B62M 25/08* (2013.01); *F21S 41/19* (2018.01); *F21S 43/19* (2018.01); *H02J 2007/0067* (2013.01)

(58) Field of Classification Search
None
See application file for complete search history.

(56) References Cited

U.S. PATENT DOCUMENTS

| | | | |
|---|---|---|---|
| 2005/0098978 A1 | 5/2005 | Kitamura et al. | |
| 2005/0180150 A1* | 8/2005 | Okada | B62J 6/02 362/473 |

(Continued)

FOREIGN PATENT DOCUMENTS

| | | |
|---|---|---|
| CN | 104136263 A | 11/2014 |
| DE | 102015012776 A1 | 4/2016 |

(Continued)

*Primary Examiner* — Jared Fureman
*Assistant Examiner* — Joel Barnett
(74) *Attorney, Agent, or Firm* — Global IP Counselors, LLP

(57) ABSTRACT

A bicycle controller and a bicycle control system are provided that effectively supply power from one battery to a plurality of bicycle components. The bicycle controller includes an electronic control unit that controls power consumed by a plurality of bicycle components. The power is supplied from a common battery. The bicycle components include at least a first component and a second component. In a case where a charge amount of the battery is a first level, the electronic control unit reduces the power of the battery consumed by the first component. In a case where the charge amount of the battery is a second level that is lower than the first level, the electronic control unit reduces the power of the battery consumed by the second component.

20 Claims, 7 Drawing Sheets

(51) Int. Cl.
*H02J 1/14* (2006.01)
*F21S 43/19* (2018.01)
*B62M 6/40* (2010.01)
*B62J 33/00* (2006.01)
*B62J 3/00* (2020.01)
*B62M 25/08* (2006.01)
*F21S 41/19* (2018.01)
*B62J 6/015* (2020.01)
*B62J 45/00* (2020.01)
*B62J 45/40* (2020.01)
*B62J 50/20* (2020.01)

(56) References Cited

U.S. PATENT DOCUMENTS

| | | | | |
|---|---|---|---|---|
| 2005/0209747 A1* | 9/2005 | Yakes | ................... | B60L 58/34 |
| | | | | 701/22 |
| 2012/0253601 A1* | 10/2012 | Ichida | ................... | B60L 58/13 |
| | | | | 701/37 |
| 2016/0056432 A1* | 2/2016 | Searles | ................ | B60L 58/14 |
| | | | | 701/22 |

FOREIGN PATENT DOCUMENTS

| | | |
|---|---|---|
| EP | 0 888 960 A2 | 6/1998 |
| JP | 11-75303 A | 3/1999 |
| JP | 2000-038187 A | 2/2000 |
| JP | 3306299 B2 | 7/2002 |
| JP | 2005-132122 A | 5/2005 |
| JP | 2007-15470 A | 1/2007 |
| JP | 3196090 U | 2/2015 |
| WO | 2017057515 A1 | 4/2017 |

* cited by examiner

BICYCLE CONTROLLER AND BICYCLE CONTROL SYSTEM

This application claims priority to Japanese Patent Application No. 2016-252052, filed on Dec. 26, 2016. The entire disclosure of Japanese Patent Application No. 2016-252052 is hereby incorporated herein by reference.

BACKGROUND

Field of the Invention

The present invention generally relates to a bicycle controller and a bicycle control system.

Background Information

A known bicycle controller controls a bicycle component based on the voltage of a battery. For example, Japanese Registered Utility Model No. 3196090 (hereinafter referred to as Patent document 1) describes a bicycle controller that changes the illumination state of a lighting device based on the charge amount of a battery that supplies power to the lighting device.

SUMMARY

It has been discovered that Patent document 1 does not indicate any study for supplying the power of the battery to a plurality of bicycle components.

One object of the present invention is to provide a bicycle controller and a bicycle control system that effectively supply power from one battery to a plurality of bicycle components.

In accordance with a first aspect of the present invention, a bicycle controller includes an electronic control unit configured to control power consumed by a plurality of bicycle components from a common battery. The bicycle components include at least a first component and a second component. The first component includes one of a shifting device, a front light, a tail light, a seatpost assembly, a suspension device, a display device, an acoustic device, a grip heater, a seat heater, a wireless communication device, a front image capturing device, a rear image capturing device, a front braking device, and a rear braking device. The second component includes one of the shifting device, the front light, the tail light, the seatpost assembly, the suspension device, the display device, the acoustic device, the grip heater, the seat heater, the wireless communication device, the front image capturing device, the rear image capturing device, the front braking device, and the rear braking device. The second component is different from the first component. The electronic control unit is configured to reduce the power of the battery consumed by the first component upon determining a charge amount of the battery is a first level. The electronic control unit is configured to reduce the power of the battery consumed by the second component upon determining a charge amount of the battery is a second level that is lower than the first level. With the bicycle controller according to the first aspect, the electronic control unit reduces the power of the battery consumed by the first component and the second component in accordance with the charge amount of the battery. This achieves the effective supply of power from one battery to a plurality of bicycle components.

In accordance with a second aspect of the present invention, the bicycle controller according to the first aspect is configured so that the electronic control unit is configured to reduce the power of the battery consumed by the first component by limiting operation of the first component or stopping supply of the power from the battery to the first component. With the bicycle controller according to the second aspect, the power supplied from the battery to the first component is reduced.

In accordance with a third aspect of the present invention, the bicycle controller according to the first or second aspect is configured so that the electronic control unit is configured to reduce the power of the battery consumed by the second component by limiting operation of the second component or stopping supply of the power from the battery to the second component. With the bicycle controller according to the third aspect, the power supplied from the battery to the second component is reduced.

In accordance with a fourth aspect of the present invention, the bicycle controller according to the second aspect is configured so that the first component includes the shifting device, and the electronic control unit is configured to operate the shifting device to obtain a predetermined shifting ratio in order to reduce the power of the battery consumed by the first component. With the bicycle controller according to the fourth aspect, situations in which the shifting ratio is fixed to a high shifting ratio or low sifting ratio are limited. This allows for comfortable riding.

In accordance with a fifth aspect of the present invention, the bicycle controller according to any one of the first to fourth aspects is configured so that the second component includes one of the front light, the tail light, the front image capturing device, the rear image capturing device, the front braking device, and the rear braking device. With the bicycle controller according to the fifth aspect, the order for reducing the power of the battery consumed by the front light, the tail light, the front braking device, and the rear braking device is lowered. Thus, a comfortable riding state tends to be maintained even if the charge amount of the battery is decreased.

In accordance with a sixth aspect of the present invention, the bicycle controller according to any one of the first to fifth aspects is configured so that the electronic control unit is configured to reduce the power of the battery consumed by the first component upon determining voltage of the battery is less than or equal to a first voltage. The electronic control unit is configured to reduce the power of the battery consumed by the second component upon determining the voltage of the battery is less than or equal to a second voltage that is less than the first voltage. With the bicycle controller according to the sixth aspect, the charge amount of the battery corresponds to the voltage of the battery. Accordingly, the power of the battery consumed by the first component and the second component is reduced in accordance with the voltage of the battery. This achieves effective supply of power from one battery to a plurality of bicycle components.

In accordance with a seventh aspect of the present invention, the bicycle controller according to any one of the first to sixth aspects is configured so that the bicycle components further include a third component that includes a motor configured to assist propelling of a bicycle. The electronic control unit is configured to reduce the power of the battery consumed by the third component upon determining the charge amount of the battery is a third level that is higher than the second level. With the bicycle controller according to the seventh aspect, while the charge amount of the battery is large, the power of the battery consumed by the third component, which consumes large power relative to the first component and the second component, is reduced. Thus, the charge amount of the battery is decreased from the third level to the second level at a lower speed. This maintains a longer period of time until the power of the battery consumed by the second component is limited.

In accordance with an eighth aspect of the present invention, the bicycle controller according to the seventh aspect is configured so that the third level of the charge amount of the battery is greater than the first level of the charge amount of the battery. With the bicycle controller according to the eighth aspect, a longer period of time is maintained until the power of the battery consumed by the first component is limited.

In accordance with a ninth aspect of the present invention, the bicycle controller according to the seventh or eighth aspect is configured so that the electronic control unit is configured to operate the third component in multiple modes that differ from one another in power consumption. The electronic control unit is configured to operate the third component in one of the multiple modes that consumes less power upon determining the charge amount of the battery is a fourth level that is higher than the third level. The electronic control unit is configured to stop the motor upon determining the charge amount of the battery is the third level. With the bicycle controller according to the ninth aspect, in a case where the charge amount of the battery is decreased, the third component is operated in a mode that consumes less power. Then, in a case where the charge amount of the battery is further decreased, the motor is stopped. Thus, the period during which the motor assists the propelling of the bicycle is maintained for a further longer time.

In accordance with a tenth aspect of the present invention, a bicycle controller includes an electronic control unit configured to control power consumed by a plurality of bicycle components from a common battery. The electronic control unit is configured to reduce the power of the battery consumed by the bicycle components in a predetermined order in accordance with a charge amount of the battery. The predetermined order is changeable. With the bicycle controller according to the tenth aspect, the electronic control unit is configured to reduce the power of the battery consumed by the bicycle components in accordance with the charge amount of the battery. This achieves effective supply of power from one battery to a plurality of bicycle components. The order of the bicycle components for reducing consumption of the power of the battery can be set in accordance with preferences of the user, for example, by changing the predetermined order.

In accordance with an eleventh aspect of the present invention, the bicycle controller according to the tenth aspect is configured so that the electronic control unit is configured to reduce the power of the battery consumed by the bicycle components by limiting operation of the bicycle components or stopping the supply of power to the bicycle components. With the bicycle controller according to the eleventh aspect, the power supplied from the battery to the bicycle components is reduced.

In accordance with a twelfth aspect of the present invention, the bicycle controller according to the tenth or eleventh aspect further includes a memory device configured to store the predetermined order. With the bicycle controller according to the twelfth aspect, the order that is changed by the user can be stored.

In accordance with a thirteenth aspect of the present invention, the bicycle controller according to the twelfth aspect is configured so that the electronic control unit is configured to change the predetermined order, which is stored in the memory device, in accordance with an instruction from at least one of an operating device located on a bicycle and an external device communicable with the electronic control unit. With the bicycle controller according to the thirteenth aspect, the predetermined order is easily changeable by the user.

In accordance with a fourteenth aspect of the present invention, the bicycle controller according to the twelfth or thirteenth aspect is configured so that the memory device is configured to store information corresponding to the charge amount of the battery for reducing the power of the battery consumed by the bicycle components in association with information corresponding to the bicycle components, and the electronic control unit is configured to change the predetermined order by changing the information corresponding to the charge amount of the battery. With the bicycle controller according to the fourteenth aspect, the predetermined order is easily changeable.

In accordance with a fifteenth aspect of the present invention, the bicycle controller according to any one of the tenth to fourteenth aspects is configured so that the bicycle components include at least a first component and a second component. The first component includes one of a drive unit that assists propulsion of a bicycle, a front shifting device, a rear shifting device, a front light, a tail light, a seatpost assembly, a front suspension device, a rear suspension device, a display device, an acoustic device, a grip heater, a seat heater, a wireless communication device, a front image capturing device, a rear image capturing device, a front braking device, and a rear braking device. The second component includes one of the drive unit, the front shifting device, the rear shifting device, the front light, the tail light, the seatpost assembly, the front suspension device, the rear suspension device, the display device, the acoustic device, the grip heater, the seat heater, the wireless communication device, the front image capturing device, the rear image capturing device, the front braking device, and the rear braking device. The second component is different from the first component. With the bicycle controller according to the fifteenth aspect, the power supplied to two different bicycle components of various combinations is sequentially reduced in accordance with the charge amount of the battery.

In accordance with a sixteenth aspect of the present invention, a bicycle controller includes an electronic control unit configured to control power consumed by a plurality of bicycle components from a common battery. The electronic control unit is configured to change an order for reducing the power of the battery consumed by the bicycle components in accordance with an environment surrounding a bicycle. With the bicycle controller according to the sixteenth aspect, the electronic control unit is configured to automatically change the order for reducing the power of the battery consumed by the bicycle components in accordance with the environment surrounding the bicycle.

In accordance with a seventeenth aspect of the present invention, the bicycle controller according to the sixteenth aspect is configured so that the bicycle components include a light, and the electronic control unit is configured to change an order for reducing the power of the battery consumed by the light in accordance with at least one of an illuminance of a surrounding of the bicycle and time. With the bicycle controller according to the seventeenth aspect, the power of the battery consumed by the light is controlled in accordance with the need for the light.

In accordance with an eighteenth aspect of the present invention, the bicycle controller according to the seventeenth aspect is configured so that the electronic control unit is configured to reduce the power of the battery consumed by the light after reducing the power of the battery consumed by one of the bicycle components that differs from the light upon determining the illuminance of the surrounding of the bicycle is less than a predetermined illuminance or the time is nighttime. With the bicycle controller according to the eighteenth aspect, the time in which the light illuminates at nighttime is maximized.

In accordance with a nineteenth aspect of the present invention, the bicycle controller according to any one of the first to eighteenth aspects is configured so that the electronic control unit is configured to invalidate an input from an operating device for operating one of the bicycle components that has reduced consumption of the power of the battery or reduces the power of the battery consumed by the operating device. With the bicycle controller according to the nineteenth aspect, the consumption of the power of the battery is further reduced.

In accordance with a twentieth aspect of the present invention, a bicycle control system includes the bicycle controller according to any one of the first to nineteenth aspects and further comprises the plurality of bicycle components. With the bicycle control system according to the twentieth aspect, power is effectively supplied from one battery to a plurality of bicycle components.

The above bicycle controller and bicycle control system effectively supply power from one battery to a plurality of bicycle components.

BRIEF DESCRIPTION OF THE DRAWINGS

Referring now to the attached drawings which form a part of this original disclosure.

DETAILED DESCRIPTION OF EMBODIMENTS

The following description illustrates various embodiments and is not intended to be restrictive. The embodiments can be modified. Further, two or more of the embodiments can be combined.

First Embodiment

Figure 1:
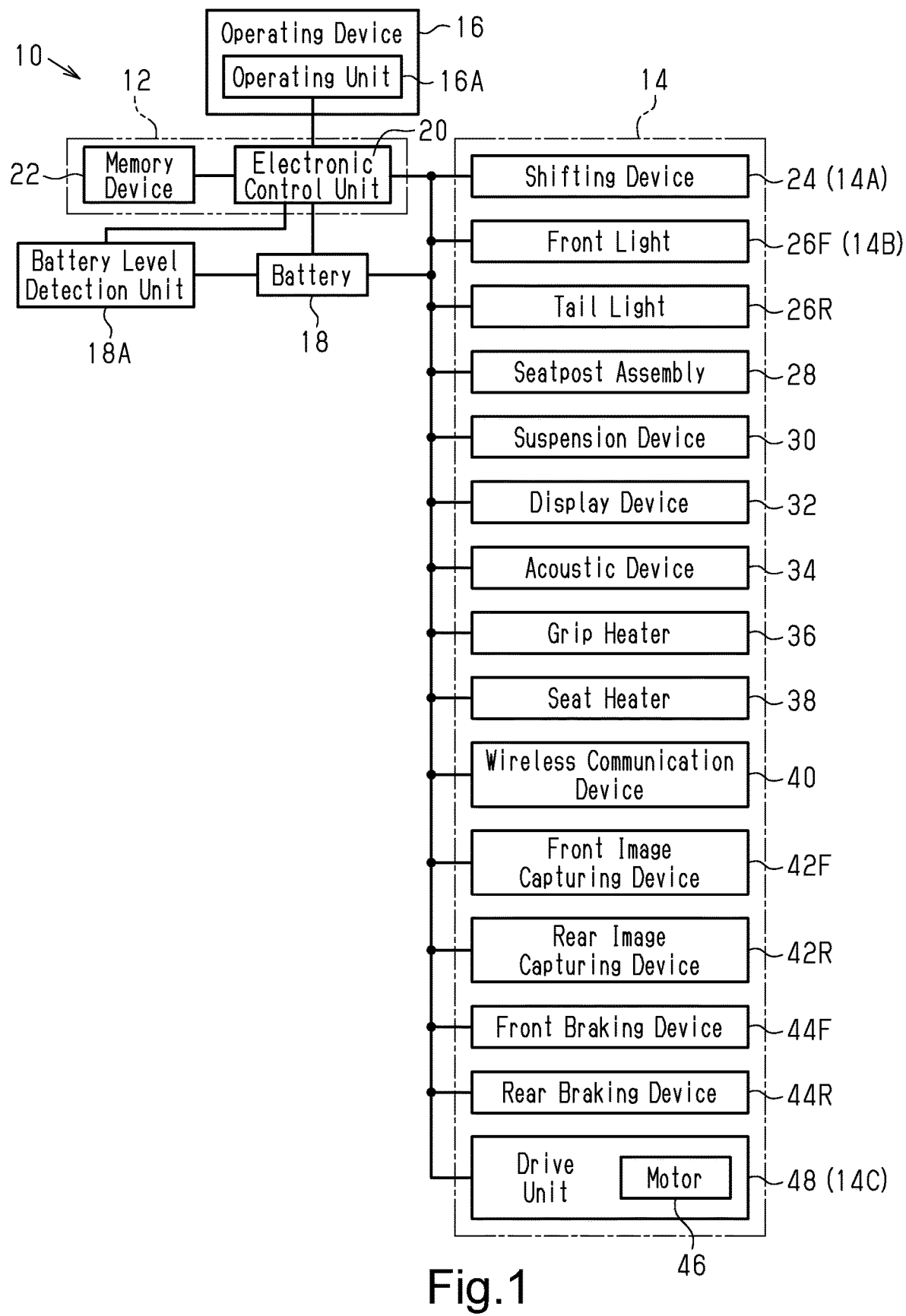
FIG. 1 is a block diagram of a bicycle control system in accordance with a first embodiment.

As shown in FIG. 1, a first embodiment of a bicycle control system 10 includes a bicycle controller 12 and a plurality of bicycle components 14. Preferably, the bicycle control system 10 further includes an operating device 16, a battery 18, and a battery level detection unit 18A. The operating device 16 and the battery 18 are electrically connected to the bicycle controller 12 through wired or wireless communication. The battery level detection unit 18A is electrically connected to the battery 18 and the bicycle controller 12 through wired or wireless communication. The operating device 16 operates the bicycle components 14. It is preferred that the operating device 16 include respective operating units 16A corresponding to the bicycle components 14. However, the operating device 16 can include one operating unit 16A that corresponds to the bicycle components 14. The operating unit 16A includes, for example, a switch. The battery 18 is electrically connected to the bicycle components 14 through wired or wireless communication to supply power to each of the bicycle components 14. The battery level detection unit 18A includes a voltmeter. The voltmeter measures the terminal voltage of the battery 18. The battery level detection unit 18A can be located in the bicycle controller 12. Alternatively, the battery level detection unit 18A can be located in the battery 18. The bicycle control system 10 can be installed to various bicycles such as a mountain bike, a road bike, and a city bike.

The bicycle controller 12 includes an electronic control unit 20. Preferably, the bicycle controller 12 further includes a memory device 22. The electronic control unit 20 is connected to the bicycle components 14 by power lines. The electronic control unit 20 is configured to perform power line communication (PLC) with the bicycle components 14. The electronic control unit 20 controls power supplied from the common battery 18 to the bicycle components 14 and consumed by the bicycle components 14. The electronic control unit 20 includes one or more arithmetic processing units. The arithmetic processing units, which execute predetermined control programs, include, for example, a central processing unit (CPU) or a micro processing unit (MPU). The electronic control unit 20 includes at least one processor. The electronic control unit 20 typically includes a general circuit such as an input interface circuit or an output interface circuit. The memory device 22 stores various kinds of control programs, multiple modes of the bicycle components 14, and information used for various kinds of control processes. The memory device 22 includes, for example, a nonvolatile memory and a volatile memory, and can includes a ROM (Read Only Memory) device, a RAM (Random Access Memory) device, a hard disk, a flash drive, etc. The memory device 22 is any computer storage device or any computer readable medium with the sole exception of a transitory, propagating signal.

The operating device 16 is located on a bicycle. The electronic control unit 20 is configured to at least receive an operation signal from the operating device 16. It is preferred that the operating device 16 and the electronic control unit 20 be configured to communicate with each other. In the present embodiment, the operating device 16 and the electronic control unit 20 are connected by a power line. The battery 18 supplies power to the operating device 16. The electronic control unit 20 is configured to perform power line communication with the operating device 16. The operating device 16 and the electronic control unit 20 can be configured to include a wireless communication unit so as to perform wireless communication with each other. In this case, the operating device 16 is provided with a power source that differs from the battery 18. The operating device 16 transmits an operation signal corresponding to an operation input to the electronic control unit 20. The electronic control unit 20 controls the bicycle components 14 in accordance with the operation signal.

The battery 18 is located on the bicycle. In one example, the battery 18 is attached to a battery holder located on a frame or rear carrier. It is preferred that the battery 18 and the bicycle components 14 be connected in parallel. The battery 18 can be directly connected to two or more of the bicycle components 14.

The battery level detection unit 18A is located, for example, on the battery holder. The electronic control unit 20 is configured to at least receive information related to the charge amount of the battery 18. It is preferred that the battery level detection unit 18A and the electronic control unit 20 be configured to communicate with each other. The battery level detection unit 18A and the electronic control unit 20 are connected by a communication line. The battery level detection unit 18A and the electronic control unit 20 can be configured to include a wireless communication unit so that the battery level detection unit 18A and the electronic control unit 20 perform wireless communication with each other. The battery level detection unit 18A transmits a signal corresponding to the terminal voltage of the battery 18 to the electronic control unit 20 as the information related to the charge amount of the battery 18. The battery level detection unit 18A can be located in the battery 18. Alternatively, the battery level detection unit 18A can be located in the bicycle controller 12. In a case where the battery level detection unit 18A is located in the battery 18, the electronic control unit 20 can function as the battery level detection unit 18A.

The bicycle components 14 are located on the bicycle. The bicycle components 14 include at least a first component 14A and a second component 14B. The bicycle components 14 further include a third component 14C.

The first component 14A includes one of a shifting device 24, a front light 26F, a tail light 26R, a seatpost assembly 28, a suspension device 30, a display device 32, an acoustic device 34, a grip heater 36, a seat heater 38, a wireless communication device 40, a front image capturing device 42F, a rear image capturing device 42R, a front braking device 44F, and a rear braking device 44R. The second component 14B includes one of the shifting device 24, the front light 26F, the tail light 26R, the seatpost assembly 28, the suspension device 30, the display device 32, the acoustic device 34, the grip heater 36, the seat heater 38, the wireless communication device 40, the front image capturing device 42F, the rear image capturing device 42R, the front braking device 44F, and the rear braking device 44R. The second component 14B is different from the first component 14A. It is preferred that the second component 14B be one of the front light 26F, the tail light 26R, the front image capturing device 42F, the rear image capturing device 42R, the front braking device 44F, and the rear braking device 44R. In one example, the first component 14A is the shifting device 24, and the second component 14B is the front light 26F. The third component 14C is a drive unit 48 that includes a motor 46 configured to assist propelling of the bicycle. The motor 46 is located in a power transmission path extending from pedals to a rear wheel or to transmit rotation to a front wheel. The motor 46 is located on the frame of the bicycle, the rear wheel, or the front wheel.

The shifting device 24 changes the ratio of the number of rotations of the rear wheel to the number of rotations of a crank. The shifting device 24 includes an electric actuator. In a case where the bicycle components 14 include the shifting device 24, the operation signals from the operating device 16 include a shift-up signal and a shift-down signal. The shifting device 24 operates the electric actuator in accordance with the shift-up signal and the shift-down signal. This changes the ratio of the number of rotations of the rear wheel to the number of rotations of the crank. The shifting device 24 can include any one of a front derailleur, a rear derailleur, and an internal shifting device.

The front light 26F is, for example, attachable to a front fork or a handlebar and illuminates the front side of the bicycle. The tail light 26R is, for example, attachable to a seatpost and illuminates the rear side of the bicycle. In a case where the bicycle components 14 include the front light 26F, the operation signals from the operating device 16 include an illumination signal that puts on the front light 26F and a non-illumination signal that puts off the front light 26F. In a case where the bicycle components 14 include the tail light 26R, the operation signals from the operating device 16 include an illumination signal that puts on the tail light 26R and a non-illumination signal that puts off the tail light 26R.

The seatpost assembly 28 includes at least one of a mechanism for adjusting the height of a seat, a mechanism for adjusting the front-rear position of the seat, and a mechanism for adjusting the angle of the seat. The seatpost assembly 28 includes an electric actuator. Operation of the electric actuator changes at least one of the height of the seat, the front-rear position of the seat, and the angle of the seat. In a case where the bicycle components 14 include the seatpost assembly 28 that includes the mechanism for adjusting the height of the seat, the operation signals from the operating device 16 include a signal for adjusting the height of the seat. In a case where the bicycle components 14 include the seatpost assembly 28 that includes the mechanism for adjusting the front-rear position of the seat, the operation signals from the operating device 16 include a signal for moving the seat frontward and rearward. In a case where the bicycle components 14 include the seatpost assembly 28 that includes the mechanism for adjusting the angle of the seat, the operation signals from the operating device 16 include a signal for changing the angle of the seat.

The suspension device 30 includes at least one of a mechanism for switching a suspension between an active state and an inactive state, a mechanism for changing the height of the suspension, and a mechanism for changing the damping force of the suspension. The suspension device 30 includes an electric actuator. Operation of the electric actuator changes at least one of the active-inactive state of the suspension function, the height of the suspension, and the damping force of the suspension. The suspension device 30 can be any of a hydraulic type or an air pressure type. In a case where the bicycle components 14 include the suspension device 30 that includes the mechanism for switching the suspension between the active state and the inactive state, the operation signals from the operating device 16 include a signal for switching the suspension between the active state and the inactive state. In a case where the bicycle components 14 include the suspension device 30 that includes the mechanism for changing the height of the suspension, the operation signals from the operating device 16 include a signal for changing the height of the suspension. In a case where the bicycle components 14 include the suspension device 30 that includes the mechanism for changing the damping force of the suspension, the operation signals from the operating device 16 include a signal for changing the damping force of the suspension.

The display device 32 is, for example, attachable to the handlebar and shows at least one of the riding state of the bicycle, the surrounding environment, the charge level of the battery 18, the state of the bicycle components 14, and the operation content of the operating device 16. The display device 32 can be integrated with the operating device 16. In a case where the bicycle components 14 include the display device 32, the operation signals from the operating device 16 can include a signal for switching activation and deactivation of the operating device 16 or a signal for switching the presentation content.

The acoustic device 34 is, for example, attachable to the handlebar. The acoustic device 34 includes a notification unit that issues a sound notification to the user. One example of the notification unit is a buzzer or a speaker. In a case where the bicycle components 14 include the acoustic device 34, the operation signals from the operating device 16 can include a signal that switches the acoustic device 34 between a state in which a notification can be issued and a state in which a notification cannot be issued.

The grip heater 36, which includes a heater located on a grip, heats the grip by supplying power to the heater. One example of the heater is a film heater. In a case where the bicycle components 14 include the grip heater 36, the operation signals from the operating device 16 include a signal for switching activation and deactivation of the grip heater 36.

The seat heater 38, which includes a heater located on the seat, heats the seat by supplying power to the heater. One example of the heater is an electric heating wire. In a case where the bicycle components 14 include the seat heater 38, the operation signals from the operating device 16 include a signal for switching activation and deactivation of the seat heater 38.

The wireless communication device 40 is, for example, communicable with the bicycle controller 12 and an external wireless communication device that is not supplied with power from the battery 18. The wireless communication device 40 includes at least one of a wireless transmission unit (wireless transmitter) or a wireless reception device (wireless receiver). Preferably, the wireless communication device 40 includes a transceiver. In a case where the bicycle components 14 include the wireless communication device 40, the operation signals of the operating device 16 can include a signal for switching activation and deactivation of the wireless communication device 40.

The front image capturing device 42F is, for example, attachable to the handlebar and captures an image of the front side of the bicycle. The rear image capturing device 42R is, for example, attachable to the seatpost and captures an image of the rear side of the bicycle. The front image capturing device 42F and the rear image capturing device 42R capture at least one of a still image and a moving image and store image signals in a predetermined format together with sounds. The front image capturing device 42F and the rear image capturing device 42R are configured to transmit the image signals to an external device through wired or wireless communication. For example, the front image capturing device 42F and the rear image capturing device 42R include a camera. In a case where the bicycle components 14 include the front image capturing device 42F, the operation signals from the operating device 16 can include a signal for switching activation and deactivation of the front image capturing device 42F, a signal for starting image capturing of the front image capturing device 42F, and a signal for stopping the image capturing of the front image capturing device 42F. In a case where the bicycle components 14 include the rear image capturing device 42R, the operation signals from the operating device 16 can include a signal for switching activation and deactivation of the rear image capturing device 42R, a signal for starting image capturing of the rear image capturing device 42R, and a signal for stopping the image capturing of the rear image capturing device 42R.

The front braking device 44F is provided so as to apply the brakes on a wheel of the front wheel. The front braking device 44F includes an electric actuator. Operation of the electric actuator applies the brakes on the wheel of the front wheel. The rear braking device 44R is provided so as to apply the brakes on a wheel of the rear wheel. The rear braking device 44R includes an electric actuator. Operation of the electric actuator applies the brakes on a wheel of the rear wheel. In a case where the bicycle components 14 include the front braking device 44F, the operation signals from the operating device 16 include a signal for instructing the front braking device 44F to apply the brakes on the wheel of the front wheel. In a case where the bicycle components 14 include the rear braking device 44R, the operation signals from the operating device 16 include a signal for instructing the rear braking device 44R to apply the brakes on the wheel of the rear wheel.

The first component 14A and the second component 14B are each operated in a first mode and a second mode. The electronic control unit 20 is configured to operate the first component 14A and the second component 14B in the first mode and the second mode. The first mode reduces the consumption of power of the battery 18. The second mode does not reduce the consumption of power of the battery 18. The first mode further includes a deactivation mode and can further include a power limitation mode. The first component 14A and the second component 14B will not operate in the deactivation mode. In the deactivation mode, the electronic control unit 20 can be configured so as not to accept the operation signals corresponding to the first component 14A and the second component 14B from the operating device 16. In the deactivation mode, the electronic control unit 20 can be configured so as not to transmit an operation instruction in accordance with the operation signals corresponding to the first component 14A and the second component 14B and received from the operating device 16. In the deactivation mode, the first component 14A and the second component 14B can be configured so as not to operate even if the operation instruction is received. In a case where the first component 14A and the second component 14B are configured to individually receive power from the battery 18 through the electronic control unit 20, the electronic control unit 20 can stop the supply of power to each of the first component 14A and the second component 14B in the deactivation mode.

Operation of the first component 14A and the second component 14B in the power limitation mode consumes less power than operation in the second mode. Chart 1 shows one example of operation of each component in the power limitation mode. In the power limitation mode, the operation of each component is limited.

CHART 1

| Bicycle Component | Operate in power limitation mode |
|---|---|
| Shifting Device | Hold predetermined shifting ratio |
| Front Light | Decrease illuminance or reduce flashing frequency per unit time |
| Rear Light | Decrease luminance or reduce flashing frequency per unit time |
| Seatpost Assembly | Hold at predetermined height |
| Suspension | Hold with predetermined hardness |
| Display Device | Decrease luminance of screen |
| Acoustic Device | Lower sound pressure |
| Grip Heater | Lower temperature |
| Seat Heater | Lower temperature |
| Wireless Communication Device | Extend communication cycle of wireless communication |
| Front Image Capturing Device | Lower frame rate |
| Rear Image Capturing Device | Lower frame rate |

The third component 14C is configured so that multiple operation modes are settable. The electronic control unit 20 is configured to operate the third component 14C in multiple modes that differ from one another in consumption power. The multiple modes include a third mode, a fourth mode, and a fifth mode. The third mode, the fourth mode, and the fifth mode have different ratios of the output of the motor 46 to manual (human or muscular) power. The third mode stops driving the motor 46. In the fourth mode, the ratio of the output of the motor 46 to manual (human or muscular) power is smaller than that of the fifth mode. The amount of power consumed in the fourth mode is less than the amount of power consumed in the fifth mode. The amount of power consumed in the third mode is less than the amount of power consumed in the fourth mode. One of the fourth mode and the fifth mode can be omitted. Each of the operation modes of the third component 14C is configured to be selected in accordance with operation of the operating device 16.

The electronic control unit 20 executes a change control that changes the mode of each of the components 14A to 14C in accordance with the charge amount of the battery 18. In one example, the charge amount of the battery 18 can be represented by the ratio of the actual charge amount of the battery to the charge amount of the fully charged battery.

The charge amount of the battery 18 is divided into multiple levels. In one example, the multiple levels include first to fifth levels. The fifth level of the charge amount of the battery 18 is greater than each of the first to fourth levels of the charge amount of the battery 18. The fourth level of the charge amount of the battery 18 is greater than the third level of the charge amount of the battery 18 and less than the fifth level of the charge amount of the battery 18. The third level of the charge amount of the battery 18 is greater than the second level of the charge amount of the battery 18 and less than the fourth level of the charge amount of the battery 18. The third level of the charge amount of the battery 18 is greater than the first level of the charge amount of the battery 18 and less than the fourth level of the charge amount of the battery 18. The second level of the charge amount of the battery 18 is less than the first level of the charge amount of the battery 18.

In one example, the charge levels of the battery 18 are separated by multiple voltage threshold values. The multiple voltage threshold values include first to fourth voltages. The first voltage separates the first level and the third level. The second voltage separates the first level and the second level. The third voltage separates the third level and the fourth level. The fourth level separates the fourth level and the fifth level. The order of the values of the first to fourth voltages from smaller ones is the value of the second voltage, the value of the first voltage, the value of the third voltage, and the value of the fourth voltage. The electronic control unit 20 determines the charge level of the battery 18 based on the relationship between the measurement result of the voltmeter of the battery level detection unit 18A and the multiple voltage threshold values.

In a case where the charge amount of the battery 18 is the third level, the electronic control unit 20 reduces the power of the battery 18 consumed by the third component 14C. More specifically, in a case where the charge amount of the battery 18 is the fourth level, the electronic control unit 20 operates the third component 14C in a mode that consumes less power. In a case where the charge amount of the battery 18 is the third level, the electronic control unit 20 stops the motor 46. In a case where the charge amount of the battery 18 is the first level, the electronic control unit 20 reduces the power of the battery 18 consumed by the first component 14A. In a case where the charge amount of the battery 18 is the second level, the electronic control unit 20 reduces the power of the battery 18 consumed by the second component 14B. In one example, in a case where the voltage of the battery 18 is less than or equal to the first voltage, the electronic control unit 20 reduces the power of the battery 18 consumed by the first component 14A. In a case where the voltage of the battery 18 is less than or equal to the second voltage, which is less than the first voltage, the electronic control unit 20 reduces the power of the battery 18 consumed by the second component 14B.

One example of the procedures of a process executed by the electronic control unit will now be described with reference to FIGS. 2 and 3. While power is supplied, the electronic control unit 20 repeatedly performs the flowcharts shown in FIGS. 2 and 3 in predetermined control cycles.

In step S11, the electronic control unit 20 determines whether or not the third component 14C is being operated. If the third component 14C is operated in the fourth or fifth mode, then the electronic control unit 20 determines that the third component 14C is being operated. If the determination result of step S11 is affirmative, then the electronic control unit 20 proceeds to step S12 and determines whether or not the charge amount of the battery 18 is greater than the fourth level.

If the determination result of step S12 is affirmative, then the electronic control unit 20 temporality ends the process. If the determination result of step S12 is negative, then the electronic control unit 20 proceeds to step S13 and determines whether or not the charge amount of the battery 18 is greater than the third level.

If the determination result of step S13 is affirmative, then the electronic control unit 20 proceeds to step S14 and determines whether or not the third component 14C is operated in the fifth mode. If the determination result of step S14 is affirmative, then the electronic control unit 20 proceeds to step S15 and sets the third component 14C to the fourth mode. If the determination result of step S13 is negative or the determination result of step S14 is negative, then the electronic control unit 20 proceeds to step S16 and determines whether or not the charge amount of the battery 18 is greater than the first level.

If the determination result of step S16 is positive, then the electronic control unit 20 proceeds to step S17 and sets the third component 14C to the third mode to stop the motor 46. If the determination result of step S16 is negative, then the electronic control unit 20 proceeds to step S18 and determines whether or not the charge amount of the battery 18 is greater than the second level.

If the determination result of step S18 is positive, then the electronic control unit 20 proceeds to step S19 and reduces the power of the battery 18 consumed by the first component 14A. The electronic control unit 20 limits the operation of the first component 14A thereby reducing the power of the battery 18 consumed by the first component 14A. In one example, in a case where the first component 14A includes the shifting device 24 and the electronic control unit 20 reduces the power of the battery 18 consumed by the first component 14A, the electronic control unit 20 operates the shifting device 24 to obtain a predetermined shifting ratio. The predetermined shifting ratio can be set to any value. However, it is preferred that the predetermined shifting ratio be set to, for example, a median shifting ratio of multiple shifting ratios or the smallest one of the shifting ratios.

If the determination result of step S18 is negative, then the electronic control unit 20 proceeds to step S20 and reduces the power of the battery 18 consumed by the second component 14B. The electronic control unit 20 reduces the power of the battery 18 consumed by the second component 14B by limiting the operation of the second component 14B or stopping the supply of power to the first component 14A. This reduces the power of the battery 18 consumed by the second component 14B. In one example, in a case where the second component 14B includes the front light 26F and the electronic control unit 20 reduces the power of the battery 18 consumed by the second component 14B, the electronic control unit 20 operates the front light 26F in the power limitation mode. The electronic control unit 20 operates the front light 26F in the first mode so that the illuminance is decreased or the flashing frequency per unit time is reduced as compared to operation in the second mode. If the determination result of step S11 is negative, then the electronic control unit 20 proceeds to the determination of step S18.

Second Embodiment

Figure 4:
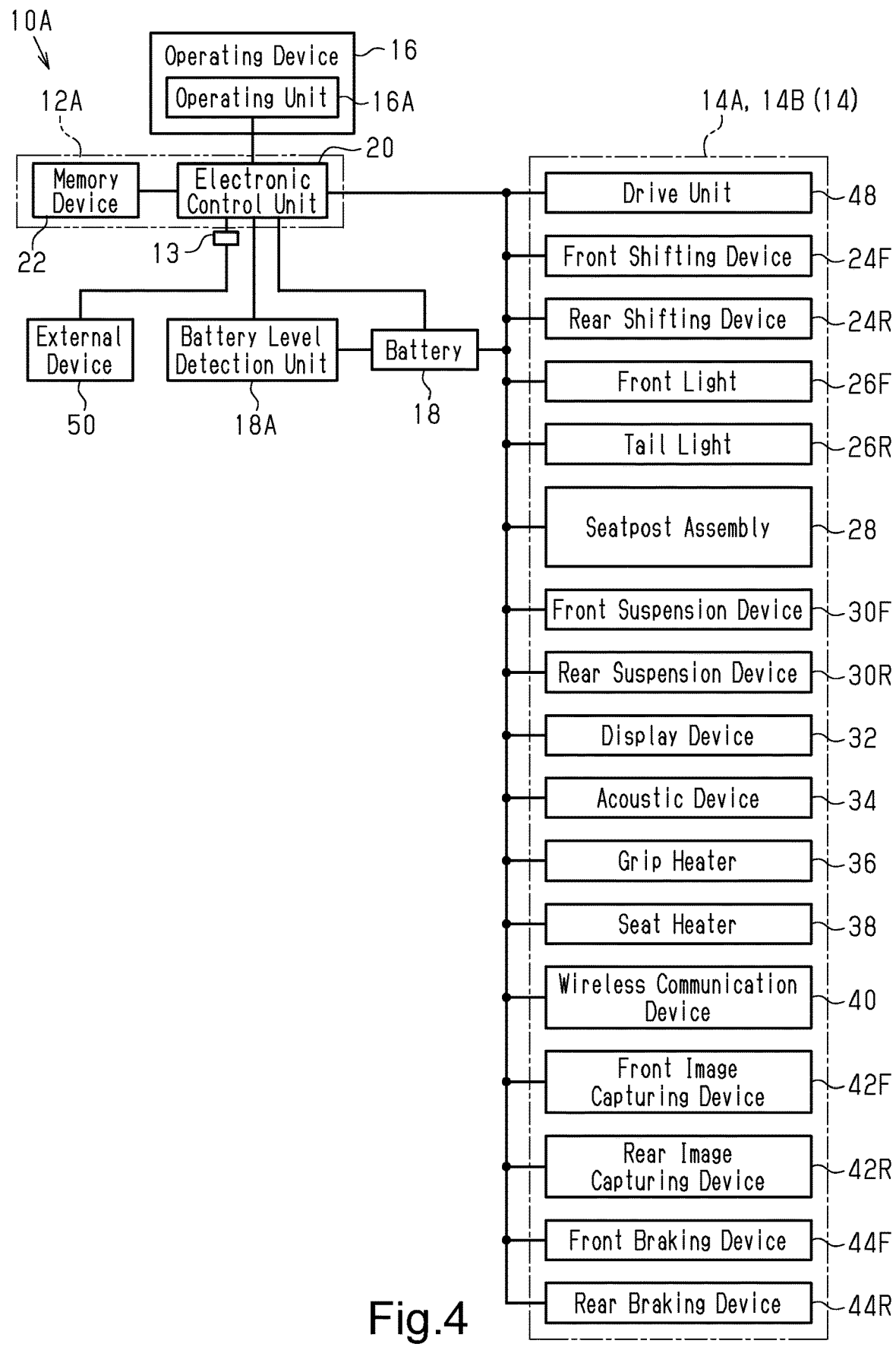
FIG. 4 is a block diagram showing a second embodiment of a bicycle control system.

As shown in FIG. 4, a second embodiment of a bicycle control system 10A includes a bicycle controller 12A and the plurality of bicycle components 14. The bicycle control system 10A of the second embodiment differs from the bicycle control system 10 of the first embodiment only in the configuration of the bicycle controller 12A and the process of the electronic control unit 20 but otherwise has the same structure as the bicycle control system 10. Thus, the same reference characters are given to those components that are the same as the corresponding components of the first embodiment. Such components will not be described in detail. The bicycle controller 12A further includes a communication portion 13 that is communicable with an external device 50. The external device 50 is communicable with the electronic control unit 20. The communication portion 13 includes at least one of a port connectable to the external device 50 by a communication line and a wireless communication module connectable to the external device 50 through wireless communication. The electronic control unit 20 is communicable with the external device 50 via the communication portion 13 through at least one of wired communication and wireless communication. The external device 50 is, for example, a personal computer, a tablet computer, or a smartphone.

The bicycle components 14 include at least a first component 14A and a second component 14B. The first component 14A includes one of the drive unit 48, a front shifting device 24F, a rear shifting device 24R, the front light 26F, the tail light 26R, the seatpost assembly 28, a front suspension device 30F, a rear suspension device 30R, the display device 32, the acoustic device 34, the grip heater 36, the seat heater 38, the wireless communication device 40, the front image capturing device 42F, the rear image capturing device 42R, the front braking device 44F, and the rear braking device 44R. The second component 14B includes one of the drive unit 48, the front shifting device 24F, the rear shifting device 24R, the front light 26F, the tail light 26R, the seatpost assembly 28, the front suspension device 30F, the rear suspension device 30R, the display device 32, the acoustic device 34, the grip heater 36, the seat heater 38, the wireless communication device 40, the front image capturing device 42F, the rear image capturing device 42R, the front braking device 44F, and the rear braking device 44R. The second component 14B is different from the first component 14A.

The electronic control unit 20 reduces the power of the battery 18 consumed by the bicycle components 14 in a predetermined order in accordance with the charge amount of the battery 18. In the same manner as the first embodiment, the electronic control unit 20 monitors the charge level of the battery 18. In a case where the charge amount of the battery 18 is the first level, the electronic control unit 20 reduces the power of the battery 18 consumed by the first component 14A. In a case where the charge amount of the battery 18 is the second level, the electronic control unit 20 reduces the power of the battery 18 consumed by the second component 14B. The electronic control unit 20 limits the operation of the bicycle components 14 thereby reducing the power of the battery 18 consumed by the bicycle components 14. In a case where the electronic control unit 20 reduces the power of the battery 18 consumed by the first component 14A, the electronic control unit 20 sets the first component 14A to the first mode. In a case where the electronic control unit 20 reduces the power of the battery 18 consumed by the second component 14B, the electronic control unit 20 sets the second component 14B to the first mode.

The memory device 22 is configured to store the predetermined order. The predetermined order is changeable. The electronic control unit 20 changes the predetermined order stored in the memory device 22 in accordance with an instruction from at least one of the operating device 16 and the external device 50. More specifically, the memory device 22 stores information corresponding to the charge amount of the battery 18 in the case for reducing the power of the battery 18 consumed by the bicycle components 14 associated with information corresponding to the bicycle components 14. In one example, the memory device 22 stores the voltage threshold values of the battery 18 for reducing the power consumed by the bicycle components 14 associated with the bicycle components 14. Chart 2 shows one example of information stored in the memory device 22.

CHART 2

| Bicycle Component Identification Information | Battery Charge Level | Voltage Threshold Value | Order for Reducing Power Consumption |
| --- | --- | --- | --- |
| Drive Unit | B1 | V1 | 1 |
| Shifting Device | B2 | V2 | 2 |
| Light | B3 | V3 | 3 |

In chart 2, the battery charge levels are B1>B2>B3. In chart 2, the voltage threshold values are V1>V2>V3. At least only one of the set of the battery charge levels and the set of the voltage threshold values needs to be stored. The memory device 22 does not necessarily have to store information indicating the order for reducing power consumption.

The electronic control unit 20 is configured to change the predetermined order by changing the information corresponding to the charge amount of the battery 18. In the present embodiment, the electronic control unit 20 changes the predetermined order by changing the battery charge levels or voltage threshold values of the battery 18 for reducing the power consumed by the bicycle components 14.

Figure 5:
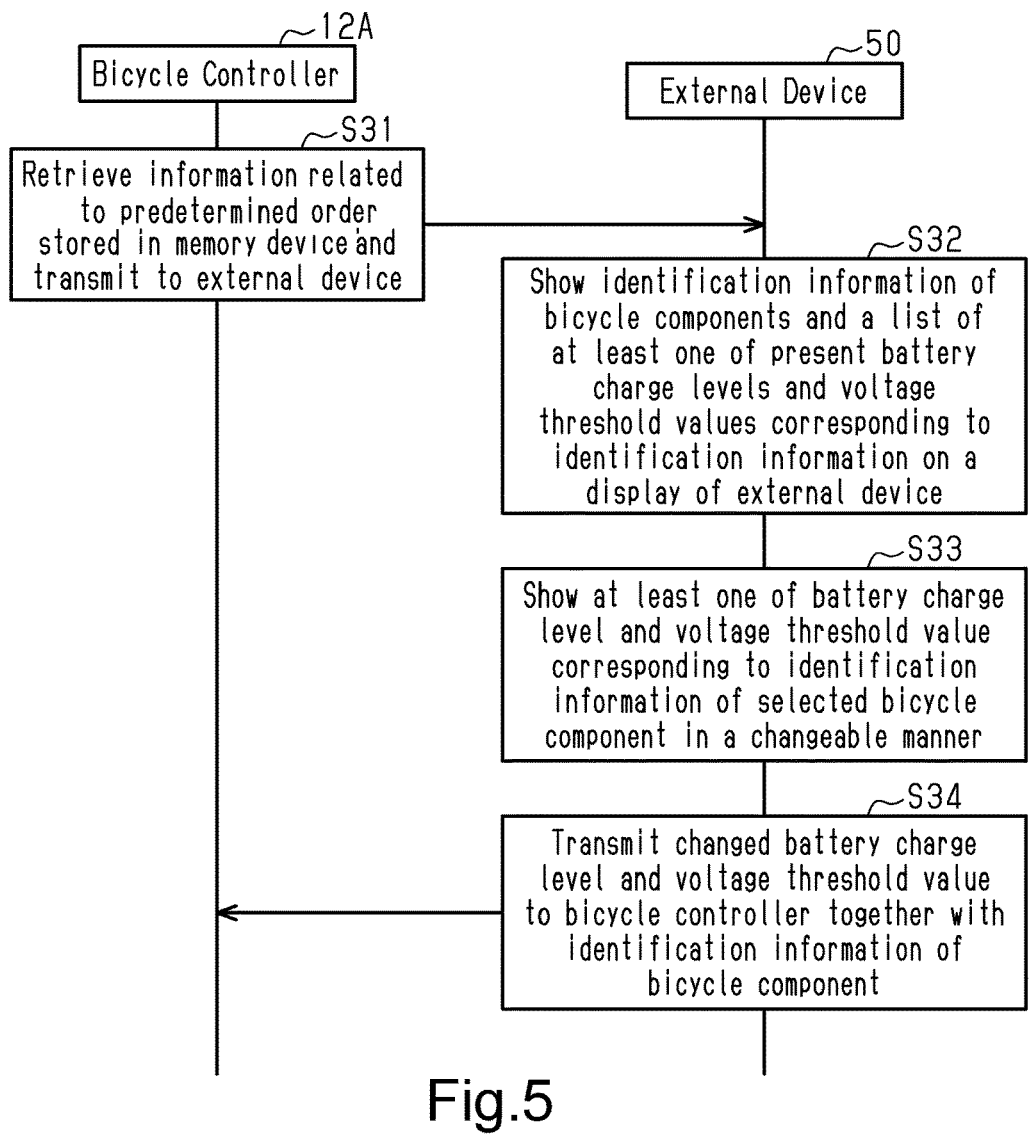
FIG. 5 is a sequence chart of the procedures for changing the order for reducing power of the battery consumed by bicycle components.

The predetermined order stored in the memory device 22 can be changed in accordance with the procedures shown in FIG. 5. In step S31, the user connects the external device 50 to the communication portion 13 and performs a predetermined operation on the external device 50 so that the electronic control unit 20 retrieves information related to the predetermined order from the memory device 22 and transmits the information to the external device 50. The information related to the predetermined order includes identification information of each bicycle component 14 and at least one of the battery charge levels and voltage threshold values that are stored in association with the identification information. The identification information of each bicycle component 14 includes at least one of the name or model number of the bicycle component 14.

If the external device 50 receives the information related to the predetermined order from the bicycle controller 12A, then in step S32, the external device 50 shows the identification information of the bicycle components 14 and a list of at least one of the present battery charge levels and voltage threshold values corresponding to the identification information on a display of the external device 50. This allows the user to select one of the bicycle components 14 on the display screen from the list of the identification information of the bicycle components 14, which is shown on the display of external device 50, to change the predetermined order of the selected bicycle component 14, for example, using an input device. Examples of the input device include a keyboard, a mouse, and a touchscreen.

In step S33, the external device 50 shows at least one of the battery charge level and voltage threshold value corresponding to the identification information of the selected bicycle component 14 so that the at least one of the battery charge level and voltage threshold value can be changed. In step S33, the user can directly input numeral values to the battery charge level and the voltage threshold value using the input device. Alternatively, in a state a pull-down list shows a number of threshold values, the user can select one of the threshold values. In a case where the battery charge level and the voltage threshold value are both shown, the battery charge level corresponds to the voltage threshold value. Thus, if one of the battery charge level and the voltage threshold value is changed, then the other one is automatically changed, accordingly. The user changes the battery charge level and the voltage threshold value and performs a predetermined operation on the external device 50. Consequently, in step S34, the external device 50 transmits the changed battery charge level and voltage threshold value to the bicycle controller 12A together with the identification information of the bicycle component 14. If the electronic control unit 20 of the bicycle controller 12A receives at least one of the battery charge level and the voltage threshold value and the identification information, then the electronic control unit 20 of the bicycle controller 12A changes and saves the battery charge level and voltage threshold value stored in the memory device 22 corresponding to the same identification information as the received identification information.

It is preferred that the electronic control unit 20 limit changes in the order for reducing the power of the battery 18 consumed by specified ones of the bicycle components 14. The specified bicycle components 14 are the drive unit 48, the seatpost assembly 28, the front suspension device 30F, the rear suspension device 30R, the display device 32, the acoustic device 34, the grip heater 36, the seat heater 38, the wireless communication device 40, the front image capturing device 42F, the rear image capturing device 42R, the front braking device 44F, and the rear braking device 44R. After reducing the power of the battery 18 consumed by the drive unit 48, the electronic control unit 20 reduces the power of the battery 18 consumed by the seatpost assembly 28, the front suspension device 30F, the rear suspension device 30R, the display device 32, the acoustic device 34, the grip heater 36, the seat heater 38, the wireless communication device 40, the front image capturing device 42F, the rear image capturing device 42R, the front braking device 44F, and the rear braking device 44R.

In the present embodiment, the predetermined order is changed by changing the battery charge levels and the voltage threshold values. Instead, the predetermined order can be changed by changing information related to the order for reducing the power consumption. For example, as shown in chart 3, the memory device 22 stores information related to the order for reducing the power consumption and at least one of the battery charge level and the voltage threshold value associated with the information. As shown in chart 4, the memory device 22 also stores identification information of bicycle components and the order for reducing the power consumption that are associated with each other.

CHART 3

| Order for reducing power consumption | Voltage Threshold Value | Battery Charge Level |
| --- | --- | --- |
| 1 | V1 | B1 |
| 2 | V2 | B2 |
| 3 | V3 | B3 |

CHART 4

| Bicycle Component Identification Information | Order for Reducing Power Consumption |
| --- | --- |
| Drive Unit | 1 |
| Shifting Device | 2 |
| Light | 3 |

The bicycle controller 12A can be configured to change the predetermined order as follows. The bicycle controller 12A transmits the identification information of the bicycle components and the information related to the order for reducing the power consumption shown in chart 4 to the external device 50. Then, the external device 50 changes the information related to the order for reducing the power consumption.

Third Embodiment

Figure 6:
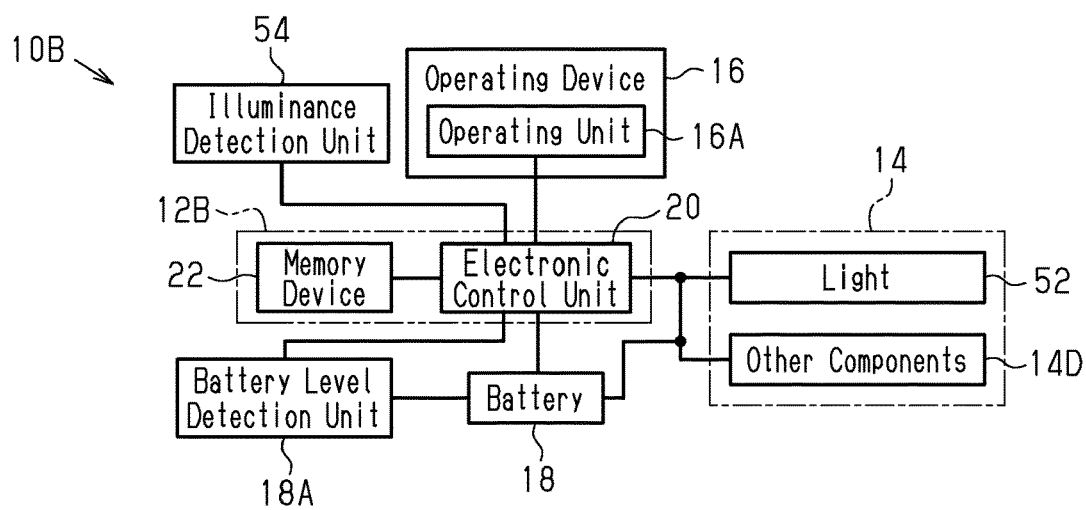
FIG. 6 is a block diagram showing a third embodiment of a bicycle control system.

As shown in FIG. 6, a third embodiment of a bicycle control system 10B includes a bicycle controller 12B and the plurality of bicycle components 14. The bicycle control system 10B of the third embodiment further includes an illuminance detection unit 54 in addition to the structure of the bicycle control system 10 of the first embodiment but otherwise has the same structure as the bicycle control system 10. Thus, the same reference characters are given to those components that are the same as the corresponding components of the first embodiment. Such components will not be described in detail. The bicycle components 14 include a light 52. The bicycle components 14 further include bicycle components 14 that differ from the light 52 (hereafter referred to as "the other components 14D"). The electronic control unit 20 is connected to the light 52 and the other components 14D as the bicycle components 14 and also connected to the illuminance detection unit 54. The light 52 includes at least one of a front light and a tail light. The other components 14D include one of the bicycle components 14 of the second embodiment shown in FIG. 4. In one example, the other components 14D include the drive unit 48.

The illuminance detection unit 54 is located on the bicycle. The electronic control unit 20 is configured to receive signals from the illuminance detection unit 54. It is preferred that the illuminance detection unit 54 and the electronic control unit 20 be configured to communicate with each other. In the present embodiment, the illuminance detection unit 54 and the electronic control unit 20 are connected by a power line. The illuminance detection unit 54 is supplied with power from the battery 18. The electronic control unit 20 is configured to perform power line communication with the illuminance detection unit 54. The illuminance detection unit 54 and the electronic control unit 20 can be configured to include a wireless communication unit so as to perform wireless communication with each other. In this case, the illuminance detection unit 54 is provided with a power source that differs from the battery 18. The illuminance detection unit 54 and the electronic control unit 20 can be connected by a power line and a signal line that are separate from each other. The illuminance detection unit 54 includes an illuminance sensor and transmits a signal corresponding to the bicycle surrounding illuminance to the electronic control unit 20.

The electronic control unit 20 changes the order for reducing the power of the battery 18 consumed by the bicycle components 14 in accordance with the environment surrounding the bicycle. The environment surrounding the bicycle includes at least one of the bicycle surrounding illuminance and time of the area where the bicycle is located. The memory device 22 stores at least one of information related to a threshold value of the bicycle surrounding illuminance and information related to a threshold value of the time. The information related to the threshold value of the time indicates time at which nighttime and daytime are switched. The time at which nighttime and daytime are switched can be set in accordance with seasons and each day. The electronic control unit 20 includes a clock function or a function to obtain time using radio waves. The time at which nighttime and daytime are switched can be set in accordance with regions. The memory device 22 can be configured to allow the user to change the information related to the threshold value of the time using at least one of the operating unit 16A and the external device 50. In a case where the information related to the threshold value of the time is changed using at least one of the operating unit 16A and the external device 50, the bicycle controller 12B includes the communication portion 13 in the same manner as the bicycle controller 12A of the second embodiment.

Chart 5 shows one example of information indicating the association of the information related to the threshold value of the bicycle surrounding illuminance with the information related to the order for reducing the power of the battery 18 consumed by the bicycle components 14, which are stored in the memory device 22. Chart 6 shows one example of information indicating the association of the information related to the time of the area where the bicycle is located with the information related to the order for reducing the power of the battery 18 consumed by the bicycle components 14 stored in the memory device 22.

CHART 5

| Order for Reducing Battery Power Consumed by Bicycle Components | Predetermined Illuminance or Higher | Less than Predetermined Illuminance |
|---|---|---|
| 1 | Light | Other Components |
| 2 | Other Components | Light |

CHART 6

| Order for Reducing Battery Power Consumed by Bicycle Components | Daytime | Nighttime |
|---|---|---|
| 1 | Light | Other Components |
| 2 | Other Components | Light |

The electronic control unit 20 changes the order for reducing the power of the battery 18 consumed by the light 52 in accordance with at least one of the bicycle surrounding illuminance and the time. In one example, the electronic control unit 20 changes the order for reducing the power of the battery 18 consumed by the light 52 with reference to the information stored in the memory device 22 corresponding to charts 5 and 6. The electronic control unit 20 determines whether or not to change the order for reducing the power of the battery 18 consumed by the light 52 in predetermined control cycles.

The electronic control unit 20 changes the predetermined order by changing at least one of the battery charge level and voltage threshold value that correspond to the light 52, changing at least one of the battery charge level and voltage threshold value that correspond to the other components 14D, or changing both of at least one of the battery charge level and voltage threshold value that correspond to the light 52 and at least one of the battery charge level and voltage threshold value that correspond to the other components 14D.

The process performed by the electronic control unit 20 for changing the predetermined order in accordance with the bicycle surrounding illuminance will now be described with reference to FIG. 7. If the bicycle surrounding illuminance is less than a predetermined illuminance, then the electronic control unit 20 reduces the power of the battery 18 consumed by the light 52 after reducing the power of the battery 18 consumed by the other components 14D.

In step S41, the electronic control unit 20 determines whether or not the bicycle surrounding illuminance is less than the predetermined illuminance. The electronic control unit 20 compares a detection result of the illuminance detection unit 54 and the information related to the predetermined illuminance stored in the memory device 22. If the determination result of step S41 is affirmative, then the electronic control unit 20 proceeds to step S42 and sets the order for reducing the consumption of power of the battery 18 to an order from the other components 14D to the light 52. The electronic control unit 20 sets, for example, a second threshold value TH2 to the voltage threshold value in the case for reducing the power of the battery 18 consumed by the light 52. Also, the electronic control unit 20 sets a first threshold value TH1 to the voltage threshold value in the case for reducing the power of the battery 18 consumed by the other components 14D. The first threshold value TH1 is greater than the second threshold value TH2 (TH1>TH2).

In step S43, the electronic control unit 20 determines whether or not the voltage value of the battery 18 is greater than the first threshold value TH1. If the determination result of step S43 is affirmative, then the electronic control unit 20 temporarily ends the process. If the determination result of step S43 is negative, then the electronic control unit 20 proceeds to step S44 and determines whether or not the voltage value of the battery 18 is greater than the second threshold value TH2.

If the determination result of step S44 is affirmative, then the electronic control unit 20 proceeds to step S45 and reduces the power of the battery 18 consumed by the other components 14D. If the determination result of step S44 is negative, then the electronic control unit 20 proceeds to step S46 and reduces the power of the battery 18 consumed by the light 52.

If the determination result of step S41 is negative, then the electronic control unit 20 proceeds to step S47 and sets the order for reducing the consumption of power of the battery 18 to an order from the light 52 to the other components 14D. The electronic control unit 20 sets, for example, the first threshold value TH1 to the voltage threshold value in the case for reducing the power of the battery 18 consumed by the light 52. Also, the electronic control unit 20 sets the second threshold value TH2 to the voltage threshold value in the case for reducing the power of the battery 18 consumed by the other components 14D.

In step S48, the electronic control unit 20 determines whether or not the voltage value of the battery 18 is greater than the first threshold value TH1. If the determination result of step S48 is affirmative, then the electronic control unit 20 temporarily ends the process. If the determination result of step S48 is negative, then the electronic control unit 20 proceeds to step S49 and determines whether or not the voltage value of the battery 18 is greater than the second threshold value TH2.

If the determination result of step S49 is affirmative, then the electronic control unit 20 proceeds to step S50 and reduces the power of the battery 18 consumed by the light 52. If the determination result of step S49 is negative, then the electronic control unit 20 proceeds to step S51 and reduces the power of the battery consumed by the other components 14D.

The process performed by the electronic control unit 20 for changing the predetermined order in accordance with the time of the area where the bicycle is located will now be described with reference to FIG. 8. If the time is nighttime, then the electronic control unit 20 reduces the power of the battery 18 consumed by the light 52 after reducing the power of the battery 18 consumed by the other components 14D.

In step S61, the electronic control unit 20 determines whether or not the present time is the nighttime. The electronic control unit 20 determines whether or not the present time is included in a range of the nighttime based on the information related to the time at which the nighttime and the daytime are switched stored in the memory device 22. If the determination result of step S61 is affirmative, then the electronic control unit 20 proceeds to step S42. From step S42 (steps S42 to S46), the electronic control unit 20 executes the same process as shown in FIG. 7. If the determination result of step S61 is negative, then the electronic control unit 20 proceeds to step S47. From step S47 (steps S47 to S51), the electronic control unit 20 executes the same process as shown in FIG. 7.

Figure 7:
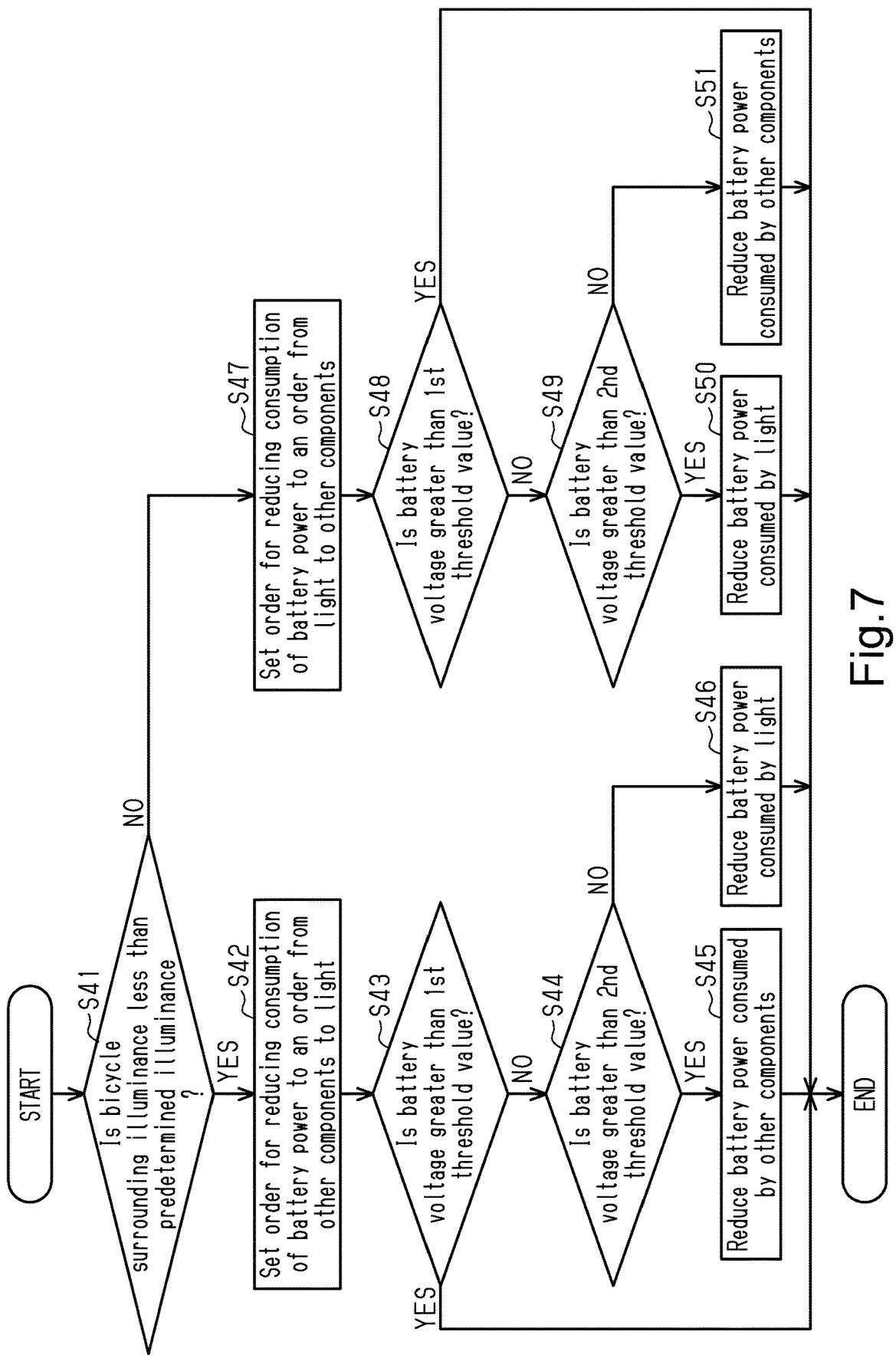
FIG. 7 is a flowchart showing one example of a process executed by the electronic control unit.
Figure 8:
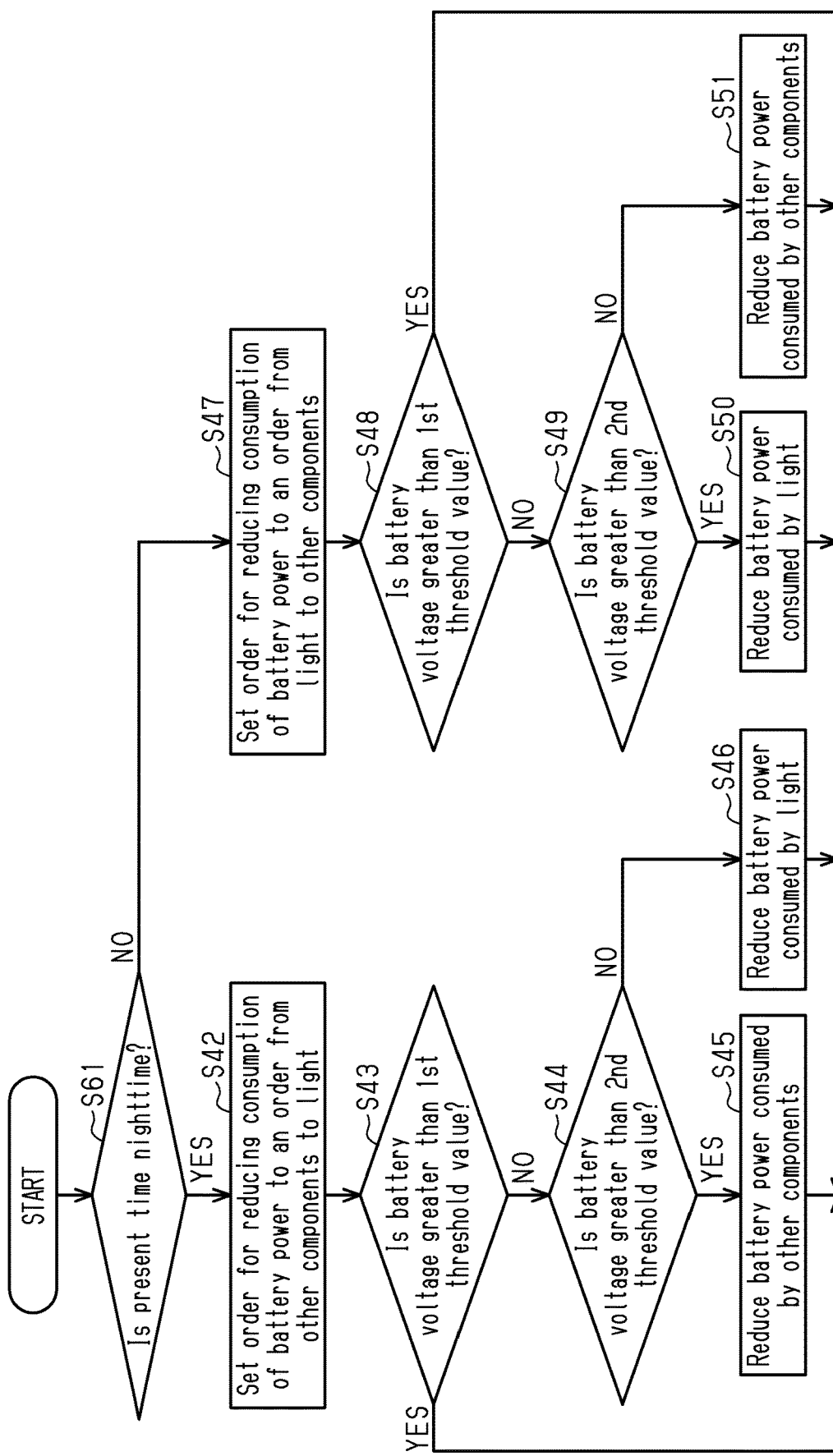
FIG. 8 is a flowchart showing another example of a process executed by the electronic control unit.

The electronic control unit 20 can execute one or both of the process shown in FIG. 7 and the process shown in FIG. 8. If both of the processes are executed, steps that have been performed are omitted.

MODIFICATIONS

The above description illustrates embodiments of a bicycle controller and bicycle control system according to the present invention and will not be intended to be restrictive. The above embodiments of the bicycle controller and bicycle control system according to the present invention may be modified as follows. Further, two or more of the modifications can be combined.

Figure 2:
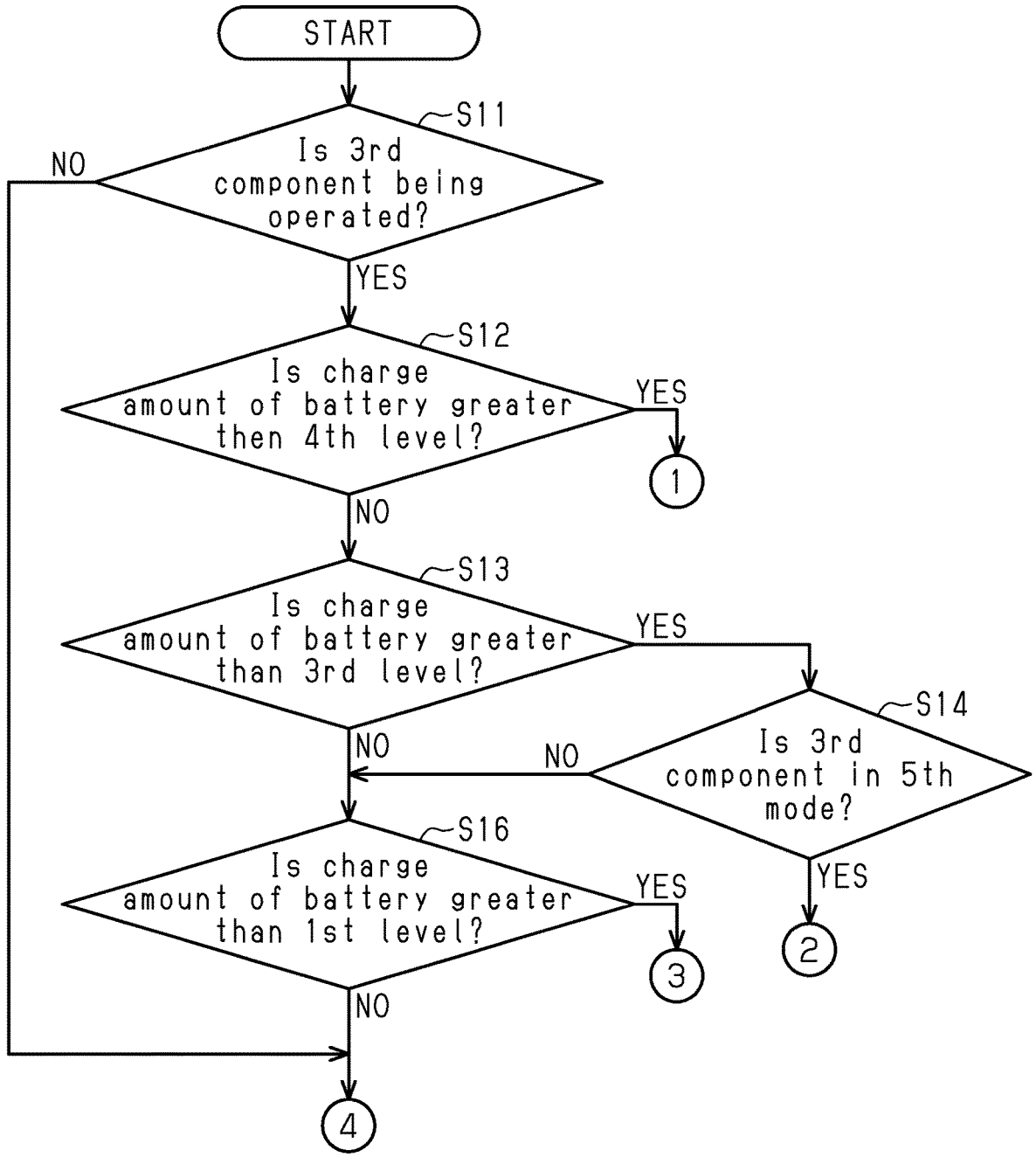
FIG. 2 is a flowchart of a process executed by an electronic control unit of the bicycle control system illustrated in FIG. 1.
Figure 3:
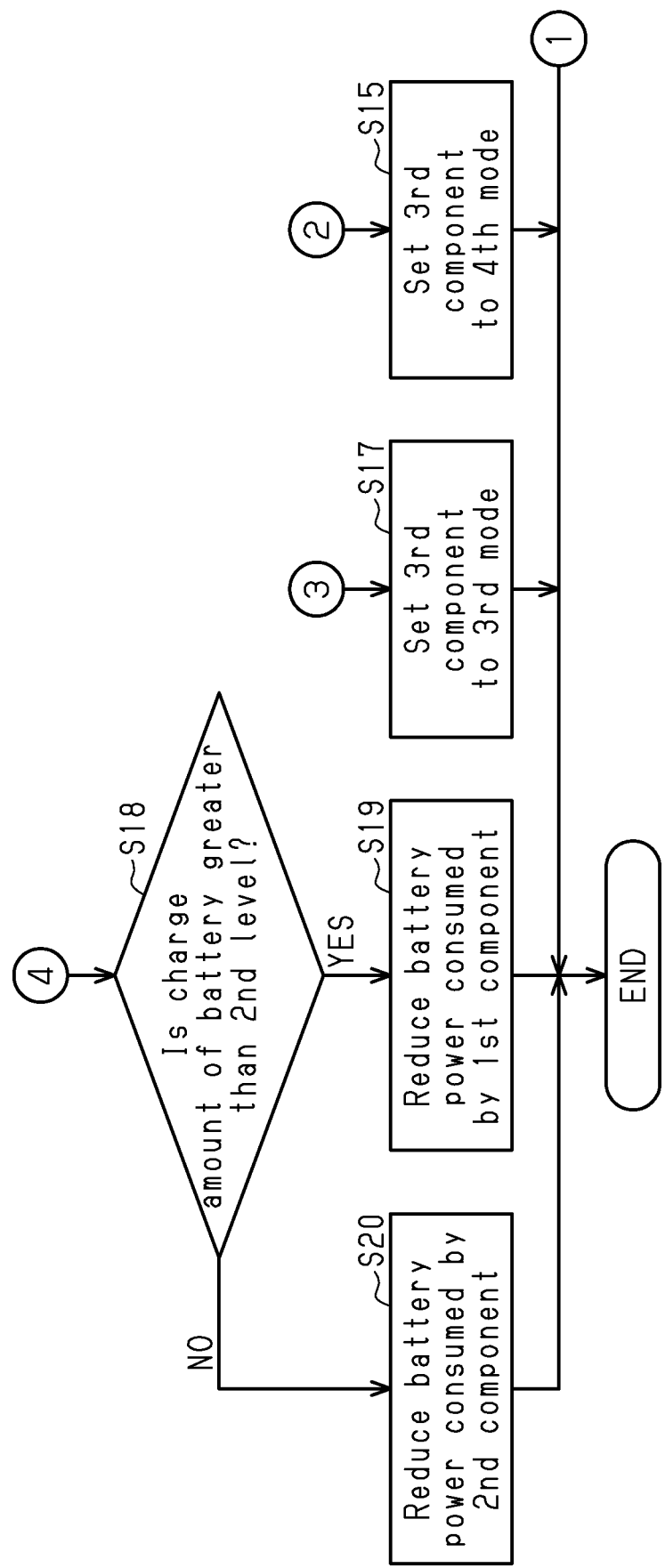
FIG. 3 is a flowchart of the process executed by the electronic control unit.

In the first embodiment, steps S11, S12, S14, S15, and S17 can be omitted from the processes shown in FIGS. 2 and 3. In this case, the bicycle control system 10 can have a structure that does not include the third component 14C.

In the first embodiment, the third level of the charge amount of the battery 18 can be greater than the second level of the charge amount of the battery 18 and less than the first level of the charge amount of the battery 18. The electronic control unit 20 stops the motor 46 after reducing the power consumption of the first component 14A. Thus, the period during which the propelling of the bicycle is assisted is maintained for a longer time.

In the second embodiment, the memory device 22 can store multiple different patterns of orders for reducing the power of the battery 18 consumed by the bicycle components 14. This allows the user to select one of the multiple patterns to change the order for reducing the power of the battery 18 consumed by the bicycle components 14, for example, using the operating unit 16A.

In the second embodiment, the user can store the change history of the order for reducing the power of the battery 18 consumed by the bicycle components 14 in the memory device 22. In this case, the user can select one from the change history to change the order for reducing the power of the battery 18 consumed by the bicycle components 14, for example, using the operating unit 16A.

In the second embodiment, in a case where the predetermined order is changeable from the operating device 16, the communication portion 13 can be omitted from the bicycle controller 12A. Alternatively, the predetermined order can be configured so as not to be changeable from the operating device 16.

In the third embodiment, the other components 14D can include the first component 14A and the third component 14C. If the bicycle surrounding illuminance is less than the predetermined illuminance or the time is nighttime, then the electronic control unit 20 can reduce the power of the battery 18 consumed by the light 52 after reducing the power of the battery 18 consumed by at least one of the first component 14A and the third component 14C.

In each of the above embodiments, the electronic control unit 20 can invalidate an input from the operating device 16 for operating the bicycle component 14 that has reduced the consumption of power of the battery 18. In one example, in a case where the electronic control unit 20 changes one of the bicycle components 14 from the second mode to the first mode in accordance with the charge level of the battery 18, the first mode is maintained even if an instruction for changing the bicycle component 14 to the second mode is received from the operating device 16.

In each of the above embodiments, the electronic control unit 20 can reduce the power of the battery 18 consumed by the operating device 16 that operates one of the bicycle components 14 that has reduced the consumption of power of the battery 18. In one example, the supply of power to the operating unit 16A, which operates one of the bicycle components 14 that has reduced the consumption of power of the battery 18, is stopped. In another example, detection of a sensor that detects operation of the operating unit 16A is stopped. For example, in a case where the operating device 16 includes a display panel, the electronic control unit 20 can decrease the luminance of the display panel or stop the presentation of the display panel to reduce the power of the battery 18 consumed by the operating device 16.

In each of the above embodiments, the electronic control unit 20 and the bicycle components 14 can be connected by signal lines and power lines that are separate from one another. In the first embodiment, in a case where the electronic control unit 20 and the bicycle components 14 are connected by separate signal lines and power lines, in step 18 of the shifting control, the electronic control unit 20 can reduce the power of the battery 18 consumed by the first component 14A by stopping the supply of power to the first component 14A. In the first embodiment, in a case where signal lines and power lines are separately connected, in step S20 of the process shown in FIG. 3, the electronic control unit 20 can reduce the power of the battery 18 consumed by the second component 14B by stopping the supply of power to the second component 14B. In the second embodiment, in a case where the electronic control unit 20 and the bicycle components 14 are connected by signal lines and power lines that are separate from one another, the electronic control unit 20 can reduce the power of the battery 18 consumed by the bicycle components 14 by stopping the supply of power to the bicycle components 14.

What is claimed is:

1. A bicycle controller comprising:
an electronic control unit configured to control power consumed by a plurality of bicycle components from a common battery,
the bicycle components including at least a first component and a second component,
the first component includes one of a shifting device, a front light, a tail light, a seatpost assembly, a suspension device, a display device, an acoustic device, a grip heater, a seat heater, a wireless communication device, a front image capturing device, a rear image capturing device, a front braking device, and a rear braking device,
the second component including one of the shifting device, the front light, the tail light, the seatpost assembly, the suspension device, the display device, the acoustic device, the grip heater, the seat heater, the wireless communication device, the front image capturing device, the rear image capturing device, the front braking device, and the rear braking device, the second component being different from the first component,
the electronic control unit being configured to reduce the power of the battery consumed by the first component upon determining only a charge amount of the battery is a first level, and
the electronic control unit being configured to reduce the power of the battery consumed by the second component upon determining only a charge amount of the battery is a second level that is lower than the first level.

2. The bicycle controller according to claim 1, wherein
the electronic control unit is configured to reduce the power of the battery consumed by the first component by limiting operation of the first component or stopping supply of the power from the battery to the first component.

3. The bicycle controller according to claim 1, wherein
the electronic control unit is configured to reduce the power of the battery consumed by the second component by limiting operation of the second component or stopping supply of the power from the battery to the second component.

4. The bicycle controller according to claim 2, wherein
the first component includes the shifting device, and
the electronic control unit is configured to operate the shifting device to obtain and hold a predetermined shifting ratio in order to reduce the power of the battery consumed by the first component.

5. The bicycle controller according to claim 1, wherein
the second component includes one of the front light, the tail light, the front image capturing device, the rear image capturing device, the front braking device, and the rear braking device.

6. The bicycle controller according to claim 1, wherein
the electronic control unit is configured to reduce the power of the battery consumed by the first component upon determining voltage of the battery is less than or equal to a first voltage, and
the electronic control unit is configured to reduce the power of the battery consumed by the second component upon determining the voltage of the battery is less than or equal to a second voltage that is less than the first voltage.

7. The bicycle controller according to claim 1, wherein
the bicycle components further include a third component that includes a motor configured to assist propelling of a bicycle, and
the electronic control unit reduce the power of the battery consumed by the third component upon determining the charge amount of the battery is a third level that is higher than the second level.

8. The bicycle controller according to claim 7, wherein
the third level of the charge amount of the battery is greater than the first level of the charge amount of the battery.

9. The bicycle controller according to claim 7, wherein
the electronic control unit is configured to operate the third component in multiple modes that differ from one another in power consumption,
the electronic control unit is configured to operate the third component in one of the multiple modes that consumes less power upon determining the charge amount of the battery is a fourth level that is higher than the third level, and
the electronic control unit is configured to stop the motor upon determining the charge amount of the battery is the third level.

10. The bicycle controller according to claim 1, wherein
the electronic control unit is configured to invalidate an input from an operating device for operating one of the bicycle components that has reduced consumption of the power of the battery or reduces the power of the battery consumed by the operating device.

11. A bicycle control system comprising the bicycle controller according to claim 1; and further comprising the plurality of bicycle components.

12. A bicycle controller comprising:
an electronic control unit configured to control power consumed by a plurality of bicycle components from a common battery,
the electronic control unit being configured to reduce the power of the battery consumed by the bicycle components in a predetermined order in accordance with only a charge amount of the battery, and
the predetermined order being changeable.

13. The bicycle controller according to claim 12, wherein
the electronic control unit is configured to reduce the power of the battery consumed by the bicycle components by limiting operation of the bicycle components or stopping the supply of power to the bicycle components.

14. The bicycle controller according to claim 12, further comprising
a memory device configured to store the predetermined order.

15. The bicycle controller according to claim 14, wherein the electronic control unit is configured to change the predetermined order, which is stored in the memory device, in accordance with an instruction from at least one of an operating device located on a bicycle and an external device communicable with the electronic control unit.

16. The bicycle controller according to claim 14, wherein the memory device is configured to store information corresponding to the charge amount of the battery for reducing the power of the battery consumed by the bicycle components in association with information corresponding to the bicycle components, and
the electronic control unit is configured to change the predetermined order by changing the information corresponding to the charge amount of the battery.

17. The bicycle controller according to claim 12, wherein the bicycle components include at least a first component and a second component,
the first component includes one of a drive unit that assists propulsion of a bicycle, a front shifting device, a rear shifting device, a front light, a tail light, a seatpost assembly, a front suspension device, a rear suspension device, a display device, an acoustic device, a grip heater, a seat heater, a wireless communication device, a front image capturing device, a rear image capturing device, a front braking device, and a rear braking device, and
the second component includes one of the drive unit, the front shifting device, the rear shifting device, the front light, the tail light, the seatpost assembly, the front suspension device, the rear suspension device, the display device, the acoustic device, the grip heater, the seat heater, the wireless communication device, the front image capturing device, the rear image capturing device, the front braking device, and the rear braking device, wherein the second component is different from the first component.

18. A bicycle controller comprising:
an electronic control unit configured to control power consumed by a plurality of bicycle components from a common battery,
the plurality of bicycle components including a light, and
the electronic control unit is being configured to reduce the power of the battery consumed by the light after reducing the power of the battery consumed by one of the bicycle components that differs from the light upon determining the time is nighttime.

19. The bicycle controller according to claim 18, wherein a memory device stores the time corresponding to the nighttime, the memory device being in communication with the electronic control unit.

20. The bicycle controller according to claim 19, wherein the time is determined using a clock of the electronic control unit or by radio waves received by the electronic control unit.

* * * * *